United States Patent [19]

Nagaoka

[11] Patent Number: 5,784,198

[45] Date of Patent: Jul. 21, 1998

[54] ENCAPSULATED LENS RETROREFLECTIVE SHEETING HAVING THERMOPLASTIC POLYURETHANE BONDING LAYER

[75] Inventor: Yoshiyuki Nagaoka, Yamagata, Japan

[73] Assignee: Minnesota Mining and Manufacturing Company, St. Paul, Minn.

[21] Appl. No.: 635,126

[22] Filed: Apr. 19, 1996

[30] Foreign Application Priority Data

May 11, 1995 [JP] Japan ................................. 7-113032

[51] Int. Cl.⁶ .............................................. G02B 5/128
[52] U.S. Cl. .......................... 359/534; 359/536; 359/540; 428/355 N
[58] Field of Search .................................... 359/534–540, 359/542, 546; 428/423.1, 412, 325, 327, 355 N, 40.1, 40.2, 67

[56] References Cited

U.S. PATENT DOCUMENTS

| | | |
|---|---|---|
| 4,025,159 | 5/1977 | McGrath . |
| 4,377,988 | 3/1983 | Tung et al. ............................. 119/106 |
| 4,533,592 | 8/1985 | Bingham ................................ 428/213 |
| 4,653,854 | 3/1987 | Miyata . |
| 4,763,985 | 8/1988 | Bingham . |
| 5,066,098 | 11/1991 | Kult et al. ............................. 359/540 |
| 5,069,964 | 12/1991 | Tolliver et al. ....................... 428/325 |

FOREIGN PATENT DOCUMENTS

| | | | |
|---|---|---|---|
| 0 291 206 A1 | 11/1988 | European Pat. Off. | ........ G02B 5/128 |
| 0 478 178 A1 | 4/1992 | European Pat. Off. | .......... G02B 1/04 |
| 0 672 920 A1 | 9/1995 | European Pat. Off. | ........ G02B 5/128 |
| 2-93684 | 4/1990 | Japan | ............... G09F 13/16 |
| 2-93685 | 4/1990 | Japan | ............... G09F 13/16 |

*Primary Examiner*—James Phan
*Attorney, Agent, or Firm*—Dsvid R. Cleveland; Karl G. Hanson

[57] ABSTRACT

An encapsulated lens retroreflective sheeting that has a bonding layer that consists essentially of a thermoplastic polyurethane resin that has a softening point of 70° C. to 200° C. The bonding layer is sealed to a light transmissible surface protective layer by a multitude of bonds that form spaces between the protective layer and the bonding layer. Retroreflective elements are partially embedded in the bonding layer and interface with air in the spaces. An encapsulated lens retroreflective sheeting of this construction can be adhered to a highly plasticized plastic surface and maintain high adhesion force for an extended duration while at the same time maintaining good retroreflective performance.

11 Claims, 4 Drawing Sheets

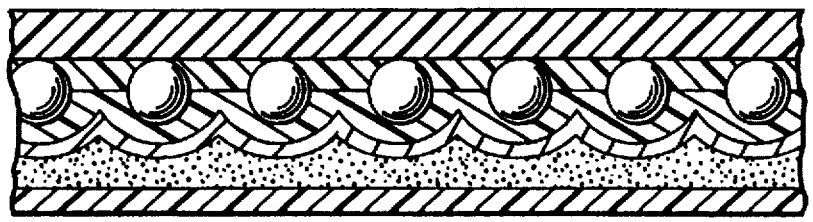
FIG. 1 (PRIOR ART)
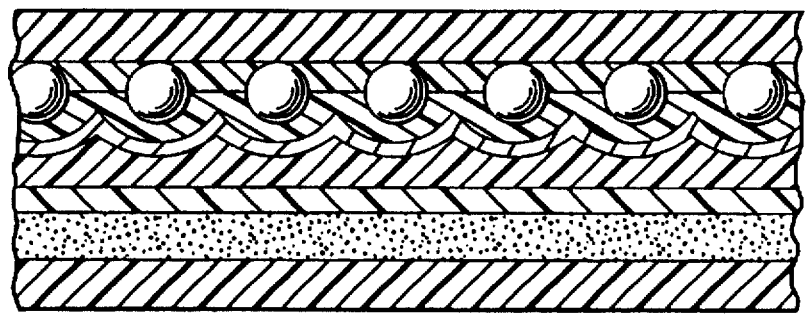
FIG. 2 (PRIOR ART)
FIG. 3 (PRIOR ART)
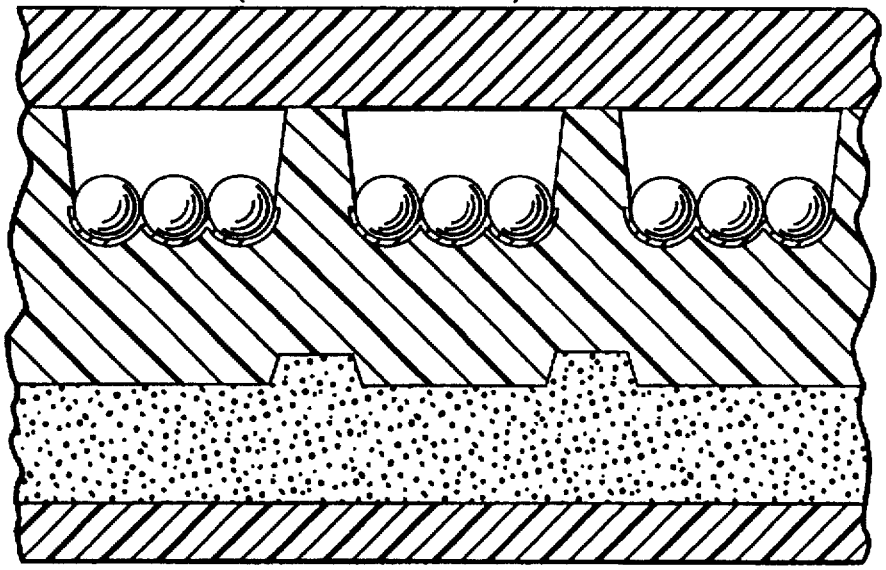

ENCAPSULATED LENS RETROREFLECTIVE SHEETING HAVING THERMOPLASTIC POLYURETHANE BONDING LAYER

TECHNICAL FIELD

The present invention pertains to a retroreflective sheeting that is adhered to an article body comprising a plasticized plastic such as a traffic cone to impart retroreflectiveness to the article.

BACKGROUND

In general, a retroreflective sheet such as an encapsulated lens type retroreflective sheet (see FIG. 3, hereinafter referred to as "encapsulated lens type sheet"), an enclosed lens type retroreflective sheet (see FIGS. 1 and 2, hereinafter referred to as "enclosed lens type sheet") and so on is adhered to a surface of an article comprising a plastic or a metal, and used.

Usually, an adhesive layer comprising an adhesive mass is separately provided on a back surface of the retroreflective sheet which is adhered to the surface of the article (opposite the surface on which the surface protective layer is present).

Some of the articles to which the retroreflective sheet is adhered contain a plasticized plastic. For example, a traffic cone is formed from a material containing plasticized polyvinyl chloride. However, when the conventional enclosed lens type sheet is adhered to the surface of the article containing the plasticized plastic, the following problems may arise:

That is, since a plasticizer migrates from the article to the adhesive layer and then to the spacing layer, the spacing layer is swelled. Thereby, a distance between the reflector and the glass microsphere is changed, and the retroreflective property (reflection luminance) decreases with time.

To prevent the decrease of reflection luminance, some improvements have been proposed.

One of examples of such improvements is an enclosed lens sheet comprising a resin layer contacting to a reflector, a barrier layer which is present below the resin layer to prevent the migration of a plasticizer, and an adhesive layer which is present below the barrier layer (see FIG. 2). This improved reflective sheet is disclosed in, for example, U.S. Pat. No. 4,377,988.

But, this improved reflective sheet still has the following drawbacks. A total thickness of the reflective sheet is increased by a thickness of the barrier, the sheet has less flexibility and is less stretched, so that it is difficult to adhere the sheet on an article having a curved surface, it is difficult to cut the reflective sheet in a desired size and form, and a production cost increases since a step for forming the barrier layer is added to the production process.

The above drawbacks of the improved enclosed lens type sheet can be avoided by the encapsulated lens type sheet. The encapsulated lens type sheet (see FIG. 3) has a reflector which contacts to the transparent microsphere, and therefore, the distance between the reflector and the transparent microsphere is hardly changed by the swell of the layer containing the resin such as the adhesive layer and the bonding layer. The encapsulated lens type sheets are disclosed in U.S. Pat. Nos. 4,025,159, 4,653,854, 5,066,098 and 5,069,964, and Japanese Patent KOKAI Nos. 2-93684 and 2-93685.

As shown in FIG. 3, in general, the capsule lens sheet has a retroreflective layer which comprises lens means made of plural transparent microspheres, a bonding layer having a support member in which the lens means is partly embedded and plural linking parts which are bonded to the protective layer so that spaces for encapsulating the transparent microspheres are formed between the protective layer and the support member and reflectors which are present with contacting the lens means; a surface protective film which is laminated on the retroreflective layer; and an adhesive layer for adhering the reflective sheet to an article. Usually, the reflective sheet has a releasing liner to protect the adhesive layer prior to the use. In general, an adhesive mass of the adhesive layer contains a pressure sensitive acrylic adhesive. Further, the bonding layer contains an acrylic resin, a polyurethane resin, a NBR resin, and the like.

When the reflective sheet comprising the adhesive layer which contains the pressure sensitive acrylic adhesive is adhered to the article comprising the plasticized plastic, its adhesion strength is deteriorated because of the migration of the plasticizer to the adhesive layer.

U.S. Pat. Nos. 4,763,985 and 4,533,592 disclose the use of a polyurethane resin as the adhesive layer. A resistance of the polyurethane adhesive to the plasticizer is higher than that of the pressure sensitive acrylic adhesive. The polyurethane adhesive has a softening point of 60° C. or lower.

While the reflective sheets have been improved in various ways in the prior arts, they have a multi-layer structure which essentially includes (1) a covering layer comprising a surface protective film, (2) a retroreflective layer which bonds the surface protective film and transparent microspheres, and has a retroreflective property, and (3) an adhesive layer which has a function to adhere the sheet to the adherent.

In these days, it is required to simplify the production process of the capsule lens sheet, that is, to eliminate any one of the layers, in view of the requirement for the reduction of production costs.

SUMMARY OF THE INVENTION

A first object of the present invention is to provide a retroreflective sheet which can be adhered to an article surface without the provision of a separate adhesive layer, and which can maintain a high reflection luminance and a high adhesion force for a long time when it is adhered to an article containing a plasticized plastic. The present invention intends to simplify the production process of the encapsulated lens type sheet and reduce the production cost.

A second object of the present invention is to provide an article having retroreflectiveness, wherein the reflective sheet is adhered to the article at a high adhesion force for a long time, the reflective sheet is hardly peeled off, and the high reflection luminance can be maintained for a long time.

To solve the above problems, the present invention provides a retroreflective sheet comprising a surface protective layer, lens means made of plural transparent microspheres, a bonding layer which comprises a support member in which said lens means is partly embedded and plural linking parts which are bonded to said protective layer so that spaces for encapsulating said transparent microspheres are formed between said protective layer and said support member, and reflectors which are present with contacting said lens means, wherein said bonding layer consists essentially of a single layer comprising a thermoplastic polyurethane resin having a softening point of 70° C. to 200° C., and a surface of said bonding layer opposite the surface to which said protective layer can be adhered to an adherent.

In addition, the present invention provides an article comprising an article body and the retroreflective sheet of the present invention which is adhered to the article body.

Components of the retroreflective sheet of the present invention will be explained further in detail. The structure of the retroreflective sheet of the present invention is shown in FIG. 4.

BRIEF DESCRIPTION OF THE DRAWINGS

FIG. 1 shows a schematic cross sectional view of an enclosed lens type retroreflective sheet.

FIG. 2 shows a schematic cross sectional view of an enclosed lens type retroreflective sheet having a barrier layer.

FIG. 3 shows a schematic cross sectional view of a conventional encapsulated lens type retroreflective sheet.

DETAILED DESCRIPTION

Bonding Layer

Figure 4:
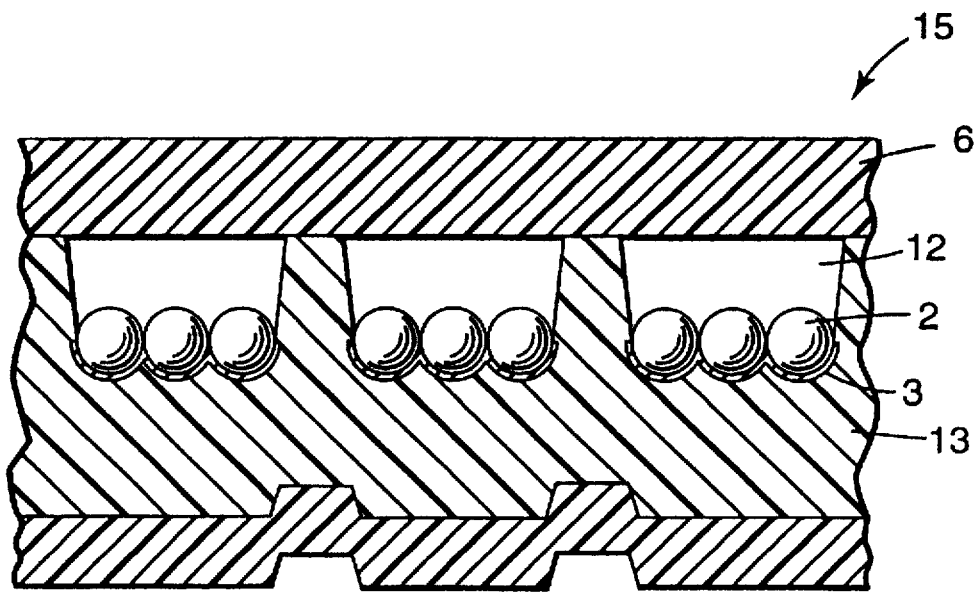
FIG. 4 shows a schematic cross sectional view of an encapsulated lens type retroreflective sheet according to the present invention.
Figure 4A:
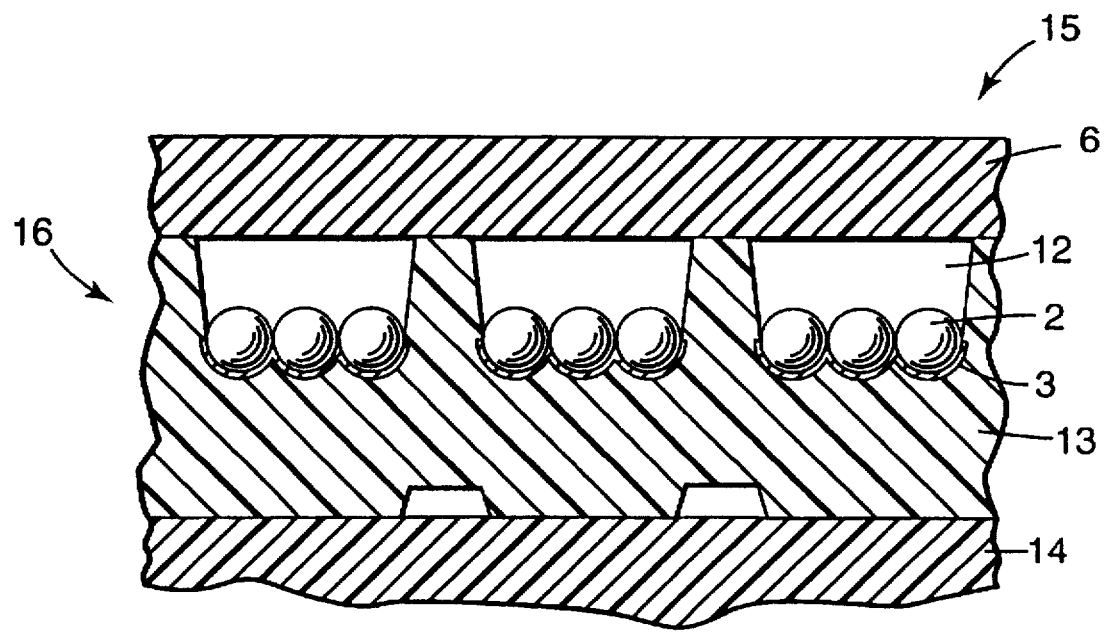
FIG. 4A shows a schematic cross sectional view of an article having retroreflectiveness including a retroreflective sheet according to the invention.

Referring to FIG. 4, the bonding layer comprises the support member in which the lens means is partly embedded and plural linking parts which are bonded to the protective layer 6 so that spaces 12 for encapsulating the transparent microspheres 2 are formed between the protective layer 6 and the support member. A surface of the bonding layer 13 opposite the surface to which the surface protective layer 6 is bonded can be adhered to the article surface 14, as shown in FIG. 4A. Then, the reflective sheet 15 of the present invention requires no separate adhesive layer.

The bonding layer of the present invention comprises a thermoplastic polyurethane resin having a softening point of 70° C. to 200° C.

Since the bonding layer comprises the thermoplastic polyurethane resin, it maintains a high adhesion force to the surface of the article containing the plasticized plastic for a long time. Accordingly, it is possible to eliminate a step for forming an adhesive layer from the production process of the reflective sheet, and it is not necessary to apply an adhesive on the article surface for adhering the reflective sheet to the article body.

When the softening point of the polyurethane resin of the bonding layer is too low, the following problems arise:

Since the polyurethane resin having the low softening point increases flowability of the bonding layer, the spaces for enclosing the lens members are collapsed by a winding pressure when the reflective sheet having such spaces is wound and stored in a roll form. As the result, the retroreflecting property is deteriorated. A conventionally used polyurethane base adhesive has in general a softening point of about 60° C. or lower, it cannot be used as the bonding layer of the present invention.

When the softening point of the polyurethane resin is too high, the reflective sheet cannot be adhered to the article surface at a sufficient adhesion force in the absence of the separate adhesion layer. The situation is the same when a resin of the bonding layer comprises a thermosetting resin, because the thermosetting resin is hardly softened by heating after it is heat cured, and a sufficient adhesion is not achieved. In such cases, the reflective sheet cannot be adhered to the article body at the sufficient adhesion force even if a primer, which will be explained below, is used.

When the resin of the bonding layer is the thermosetting resin, the softening point of the bonding layer is relatively high, the formation of the spaces tends to be difficult. For the above reasons, the softening point of the thermoplastic polyurethane resin is preferably from 80° to 180° C., more preferably from 100° to 150° C. The softening point herein used is a value measured by a ring and ball method.

When the adhesion force is expressed by a peeling strength of the reflective sheet at an angle of 180 degrees in relation to the article body, it is preferably at least 2 kg/25 mm, more preferably at least 3 kg/25 mm. When the adhesion force is less than 2 kg/25 mm, the reflective sheet may be peeled off when it is adhered to the article body and used outdoors. Herein, the peeling strength is measured according to JIS Z 0237 8.31.

The bonding layer "consisting essentially of a single layer" is intended to mean that there is no interlaminar interface between layers having different compositions in the bonding layer. The interlaminar interface may cause the peeling at the interlaminar interface, when the reflective sheet is adhered to the article containing the plasticized plastic. The bonding layer consisting essentially of a single layer includes a single layer that may be formed by coating or extruding a composition containing components of the bonding layer, or at least two layers formed from the same composition. The thickness of the bonding layer can be made relatively large by laminating at least two layers.

One of the preferred polyurethane resins is a polycarbonate polyurethane. The polycarbonate polyurethane has good adhesion forces to the surface protective layer, the lens members, and the article body, and is excellent in resistance to hydrolysis. Therefore, it will improve the practical durability of the reflective sheet which is used outdoors. When the article contains the plasticized plastic, the high adhesion force can be easily maintained for a long time.

The glass transition temperature of the polyurethane resin is preferably −10° C. or lower, more preferably −20° C. or lower. When the glass transition temperature is higher than −10° C., the adhesion force of the bonding layer to the surface protective layer, the lens members or the adherent tends to decrease.

Preferably, the polyurethane resin has a weight average molecular weight of 70,000 to 150,000.

A thickness of the bonding layer is preferably from 50 to 150 micrometers (μm.)

The surface of the bonding layer which can be adhered to the article body has indentations which correspond to net-form linking parts having a narrow width which are formed in the below explained production process. It is possible to make this surface flat to disappear indentations, whereby the adhesion force to the surface of the article body is increased.

Surface Protective Layer

As the surface protective layer, there may be used a single layer or a laminated film of one or more plastic films made of polyester resins, polyolefin resins, acrylic resins, polyurethane resins, polyvinyl chloride resins, fluororesins, ionomer resins, and so on.

A thickness of the surface protective layer is preferably from 10 to 200 μm, more preferably from 30 to 100 μm.

The surface protective layer may contain an additive such as an antioxidant, a UV light absorber, a colorant, etc.

Transparent Microspheres

As the transparent microspheres, glass beads or plastic beads having a desired refractive index may be used. A desired refractive index is usually from 1.4 to 2.7, preferably from 1.6 to 2.3.

When the refractive index is outside this range, the retroreflectiveness may be lost. That is, an amount of light which is retroreflected in the direction of the incident light is decreased, while an angle of observation of the reflected light is widened. Widening of the angle of observation to some extent may be used in a retroreflective sheet of a wide angle of observation type, which widens the angle of observation with maintaining the reflection luminance in an acceptable range. However, if the angle of observation is too large, the reflection luminance is decreased to a practically unpreferred level. Then, the more preferred refractive index is in the range between 1.9 and 2.1.

A diameter of the microsphere is usually from 10 to 860 μm, preferably from 20 to 150 μm, more preferably from 25 to 80 μm. When the diameter is too small, it is difficult to produce microspheres having a uniform diameter and a uniform refractive index, and the reflection luminance of the reflective sheet comprising such microspheres tends to decrease and the retroreflectiveness tends to deteriorate. When this diameter is too large, the thickness of the reflective sheet may increase, and the flexibility of the reflective sheet tends to decrease. The decrease of the flexibility of the reflective sheet causes peeling off of the reflective sheet when the sheet is adhered to the adherent.

Two or more kinds of the transparent microspheres having different refractive indexes may be used in combination, or two or more types of the transparent microspheres having different diameters may be used in combination.

When the transparent microspheres are colored by a colorant with maintaining the light transparency, reflected light has a different color from that of the incident light.

Reflector

As the reflector 3 shown in FIG. 4, a thin film having specular gloss, a reflective resin film containing a pearlescent pigment and the like can be used. The thin film may be formed by a thin film forming method such as vapor deposition from a metal such as aluminum, copper, silver, gold, zinc, etc. or a compound such as $CeO_2$, $Bi_2O_3$, ZnS, $TiO_2$, $CaF_2$, $Na_3AlF_6$, $SiO_2$, $MgF_2$, etc. The reflective resin film may be formed by covering a paint comprising a resin and a pearlescent pigment (e.g. $BiOCl_4$, $PbCO_3$, guanine obtained from fish scales, etc.) on the lens element.

A thickness of the reflector is usually from 0.01 to 10 μm, preferably from 0.05 to 5 μm.

The pearlescent pigment may be added to the bonding layer to increase the reflection efficiency of the reflector.

Spaces for Encapsulating the Lens Members

The spaces for encapsulating the lens members are formed between the surface covering layer and the lens members with separating the surface covering layer and the lens members at a specific distance. With these spaces, the desired high reflection luminance is achieved. The formation of such spaces will be explained in connection with the production process.

Primer

In a preferred embodiment, the adhesion of the reflective sheet of the present invention to the adherent such as the article body is effected by applying a primer on the surface of the adherent, and adhering the surface of the bonding layer opposite the surface on which the surface protective layer is bonded, to the primer-applied surface.

As the primer, a solution containing a polymeric polyamine or the above described thermoplastic polyurethane is used. The primer improves the wettability between the adhering surface of the bonding layer and the surface of the adherent, and also dissolves the polyurethane resin on the adhering surface to impart an adhesion property thereto.

As a solvent to be contained in the solution, methyl ethyl ketone, methyl isobutyl ketone, cyclohexanone, butyl carbitol, toluene, isopropyl alcohol, or their mixtures may be used.

A solvent itself which has a solubility parameter close to the polyurethane resin and a low evaporation rate such as butyl carbitol may be used as a primer containing no polymer.

Figure 5:
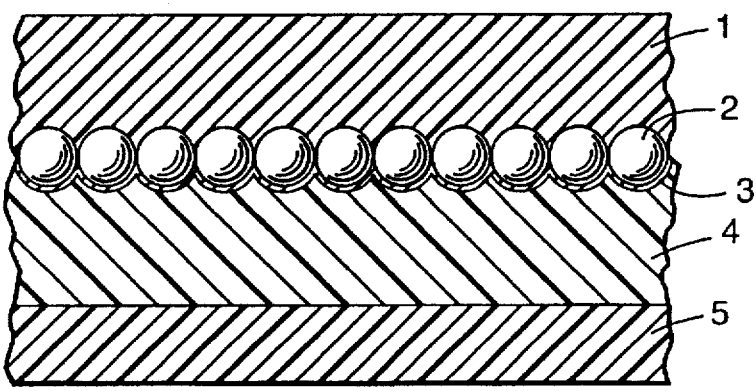
FIGS. 5, 6 and 7 show steps of the production process of the conventional encapsulated lens type retroreflective sheet.
Figure 6:
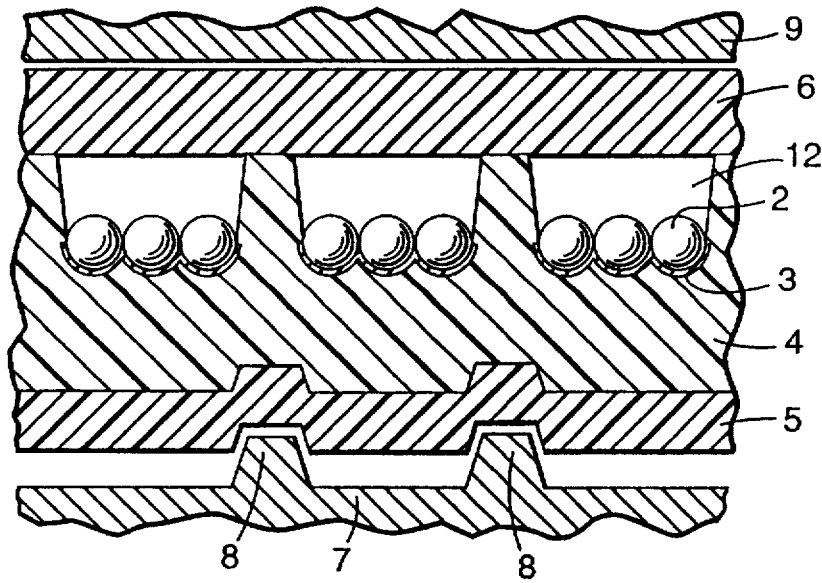
Figure 7:
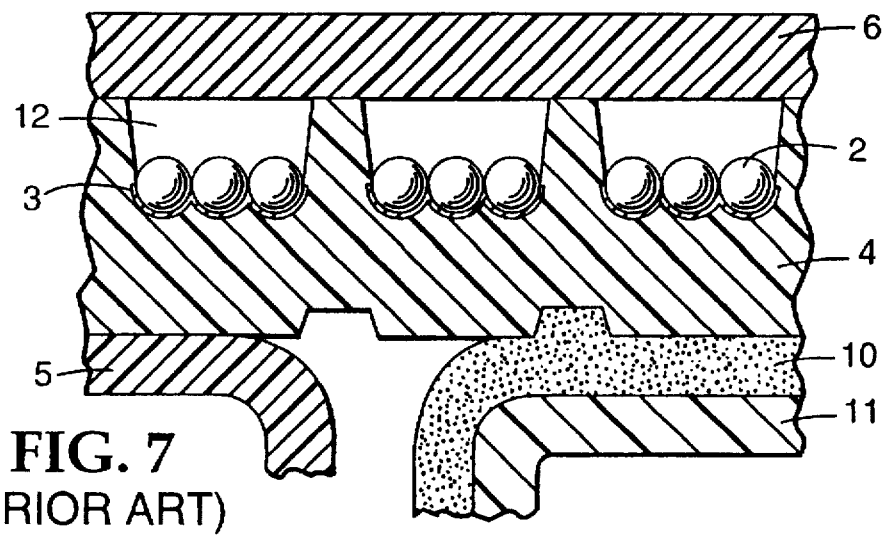
Figure 8:
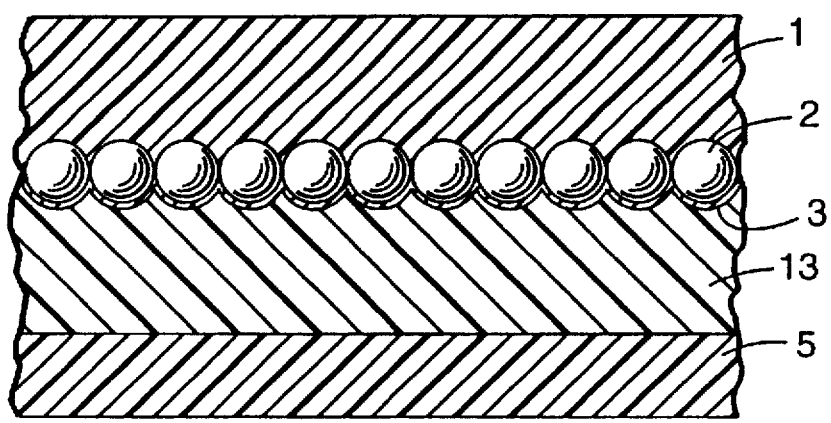
FIGS. 8 and 9 show steps of the production process of the encapsulated lens type retroreflective sheet according to the present invention.
Figure 9:
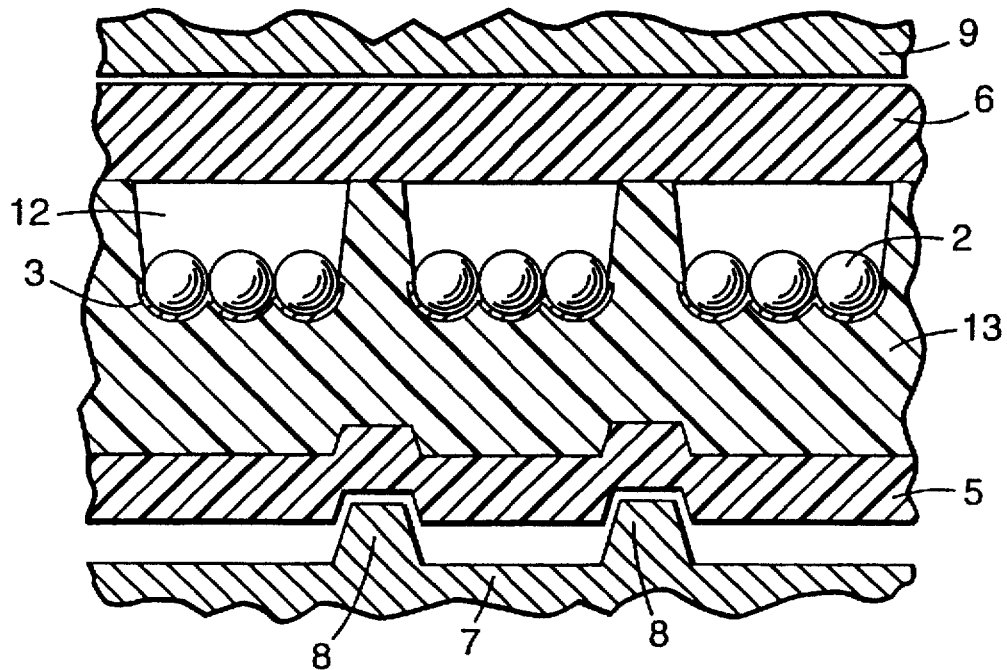

The production process of the reflective sheet according to the present invention will be explained by making reference to FIGS. 8 and 9. For comparison, FIGS. 5, 6 and 7 show the production process of the conventional encapsulated lens type sheet having the conventional adhesive layer.

The production process of the encapsulated lens type sheet having the conventional adhesive layer comprises the following steps:

(1) On a carrier web, transparent microspheres 2 are partly embedded detachably to form a transparent microsphere layer which comprises the transparent microspheres as the lens means.

(2) On a surface of the exposed part of each microsphere 2, a mirror reflecting layer 3 is formed as a reflector by a thin film forming method.

(3) On the mirror reflecting layer 3, bonding layer 4 (shown as 13 in FIGS. 8 and 9) and a releasing film 5 are laminated.

(4) After the step (3), the carrier web 1 is removed to expose surfaces of microspheres 2 which are not covered by the mirror reflecting layer 3.

(5) On the surfaces of the microspheres 2 which are not covered by the mirror reflecting layer 3, the surface protective layer 6 is placed with leaving a predetermined gap.

(6) Then, on a releasing film 5, an embossing mold 7 having a net-form emboss pattern of thin lines 8 is pressed with heating to emboss the bonding layer 4 through the releasing film 5, whereby net-form linking parts having a narrow width, which bond the surface protective layer 6 partly to the bonding layer 4, are formed. At the same time, the combination of the linking parts and the surface protective layer 6 forms plural spaces 12.

(7) The releasing film 5 is removed to expose the other surface (to which an adhesive layer will be laminated) opposite the surface of the bonding layer 4 on which the surface protective layer 6 is bonded.

(8) On the other surface of the bonding layer, an adhesive layer having a releasing liner 11 is laminated.

In comparison with the production process of the capsule lens type having the conventional adhesive layer, the steps (7) and (8) can be eliminated in the production process of the encapsulated lens type sheet according to the present invention. That is, in the production process of the encapsulated lens type sheet according to the present invention, the releasing film 5 as such is used as the releasing liner to provide a final product.

Before the present invention, the releasing film 5 should be wasted as a used material from the production process, while the present invention provides an excellent production process from the view point of economy of resources.

Article Having Retroreflectiveness

An article 16 having retroreflectiveness according to the present invention comprises an article body 14 and the retroreflective sheet 15 of the present invention which is adhered to the article body 14, as shown in FIG. 4A. Since the retroreflective sheet has the above described structure, the sheet can be adhered to the article body with the high adhesion force for a long time, there is less possibility that the sheet is peeled off from the article body, and the high reflection luminance is maintained for a long time.

The article having retroreflectiveness according to the present invention has much better properties of maintaining the high adhesion force and high reflection luminance for a long time than the conventional encapsulated lens type sheet, when the article body contains the plasticized plastic, in particular, the plasticized polyvinyl chloride base resin.

Herein, the polyvinyl chloride base resin includes a homopolymer of vinyl chloride and vinyl chloride copolymers. Examples of the vinyl chloride copolymer are copolymers of vinyl chloride with at least one other copolymerizable monomer such as vinyl acetate, vinyl alcohol, vinyl acetal, maleic acid, styrene monomer, etc. Examples of the plasticizer to be contained in the polyvinyl chloride base resin are phthalate base plasticizers, polyester base plasticizers, adipate base plasticizers, fatty acid base plasticizers, trimellitate base plasticizers, epoxy base plasticizers, and so on. A content of the plasticizer is from 1 to 50 wt. % of the whole resin.

EXAMPLE 1

(1) Production of capsule lens type retroreflective sheet.

By the above steps (1) through (6), an encapsulated lens type sheet of the present invention was produced. The details of the materials used in this Example were as follows:

Transparent microspheres:
   Glass beads having an average diameter of 65 µm.
Reflecting layer:
   An aluminum layer formed, by vapor deposition, on the exposed surfaces of the transparent microspheres which were embedded in the carrier web to a depth of about 30% of the diameter, by vapor deposition.
Bonding layer:
   A bonding layer having a thickness of about 50 µm was formed by coating a solution for a bonding layer prepared from the following components over the aluminum layer formed on the transparent microspheres, and drying the coated solution:

| Component | Wt. Parts |
| --- | --- |
| Thermoplastic polyurethane (Polycarbonate polyurethane manufactured by Nippon Polyurethane Co., Ltd. Trade name: N-5199. Softening point of about 105° C.) | 24.67 |
| Titanium dioxide (Taipeic manufactured by Ishihara Industries, Ltd.) | 7.00 |
| Antioxidant (Irganox manufactured by Ciba Geigy) | 0.48 |
| Stearic acid | 0.48 |
| Methyl ethyl ketone | 49.49 |
| Cyclohexanone | 17.88 |

Releasing film:
   A laminate film of a polyethylene layer having a thickness of 36 µm and a polyester layer having a thickness of 14 µm.

On the adhering surface of the bonding layer, this releasing film was laminated with facing the polyethylene layer to the bonding layer at 100° C. under 3 kg/cm².

Surface protective layer:
   An ethylene-acrylic acid copolymer film containing a UV light absorber with a thickness of about 75 µm (Primacor 3440 manufactured by Dow Chemical).
Space (air) layer
   The laminate produced by the steps (1) through (5) was embossed between an embossing roll heated at 160° C. as a mold having the net-form emboss pattern of thin lines, and a rubber roll heated at 25° C.

(II) Adhesion of reflective sheet

A primer solution having the following composition was coated on a substrate made of a plasticized polyvinyl chloride (commercially sold soft vinyl chloride resin), and then the reflective sheet which had been produced was placed and pressed by a press roll:

| Component | Wt. Parts |
| --- | --- |
| Thermoplastic polyurethane (The same as that used in the bonding layer) | 10.00 |
| Methyl ethyl ketone | 58.50 |
| Toluene | 18.00 |
| Isopropyl alcohol | 13.50 |

The substrate carrying the adhered reflective sheet was kept in an oven at 65° C. for one week to carry out an aging test.

After aging, the adhesion force (180 degree peeling strength) and retention of reflection luminance were measured.

With the reflective sheet of this Example, the adhesion strength by the 180 degree peeling test was 3.5 kg/25 mm, which was at the same level as the adhesion strength before aging.

The retention of reflection luminance was 98%. This result means that the reflective sheet of this Example does not lose the excellent property for maintaining the reflection luminance, which is one of the advantages of the encapsulated lens type sheet.

EXAMPLE 2

In the same manner as in Example 1 except that the thermoplastic polyurethane resin was changed to a thermoplastic polyurethane "N-5230" having the softening point of 130° C. (manufactured by Nippon Polyurethane), a reflective sheet was produced.

The reflective sheet of this Example had substantially the same test results as that of Example 1.

COMPARATIVE EXAMPLE 1

In the same manner as in Example 1 except that the thermoplastic polyurethane resin was changed to a thermoplastic polyurethane "N-2301" (manufactured by Nippon Polyurethane), and as a crosslinking agent, a polyisocyanate compound, Colonate L (manufactured by Nippon Polyurethane) was added to the resin composition for the bonding layer, a reflective sheet was produced.

The reflective sheet of this Comparative Example did not have sufficient adhesion force when it was adhered to the substrate, since the softening point of the cured bonding layer was 190° C.

COMPARATIVE EXAMPLE 2

In the same manner as in Example 1 except that the thermoplastic polyurethane resin was changed to a thermoplastic polyurethane "N-3113" having the softening point of 45° C. (manufactured by Nippon Polyurethane), a reflective sheet was produced.

Since the softening point of the bonding resin was too low, the bonding layer had large flowability, so that, when the sheet was wound and stored in the production process, the spaces (air layer) were collapsed by the winding pressure of the rolled sheet. As the result, a practically satisfactory encapsulated lens type sheet could not be produced.

COMPARATIVE EXAMPLE 3

The adhesion procedure and the aging test were repeated in the same manner as in Example 1 except that #3840 of 3M which is a conventional encapsulated lens type sheet was used as a reflective sheet, while no primer was used.

This reflective sheet had an adhesive layer comprising an acrylic pressure sensitive adhesive, on the adhering surface of the bonding layer.

In this Comparative Example, the retention of reflection luminance was 95%, while the adhesion force was very low and only 0.6 kg/25 mm.

COMPARATIVE EXAMPLE 4

The procedures of Comparative Example 3 were repeated using, as comparative samples, three enclosed lens type sheets. The comparative samples and results are as follows:

Sample/results

1) #580 of 3M (an adhesive layer comprising an acrylic pressure sensitive adhesive)/Adhesion force=0.7 kg/25 mm; Retention of reflection luminance=40%.

2) #FV-5000 of 3M (an adhesive layer comprising an acrylic pressure sensitive adhesive)/Adhesion force=1.6 kg/25 mm; Retention of reflection luminance=52%.

3) Reflective sheet manufactured by Unitica (an adhesive layer comprising a polyurethane base adhesive)/Adhesion force=2.5 kg/25 mm; Retention of reflection luminance= 81%.

The sheets 1) and 2) had the low adhesion force, since they were adhered to the article body through the adhesion layer comprising the acrylic pressure sensitive adhesive.

The sheet 3) is an example of the reflective sheet using the adhesion layer comprising the polyurethane base adhesive. This sheet had a lower adhesion force than that of Example 1. This indicates that the encapsulated lens type sheet using the polyurethane base adhesive in the adhesion layer would have the same result. Since these sheets are the enclosed lens type sheet, they had the lower retention of reflection luminance than that of Example 1.

I claim:

1. An encapsulated lens retroreflective sheeting that comprises:
   (a) a light transmissible surface protective layer;
   (b) a bonding layer sealed to the surface protective layer by a plurality of bonds that form spaces between the protective layer and the bonding layer; and
   (c) retroreflective elements partially embedded in the bonding layer and interfacing with air in the spaces;
   wherein the bonding layer consists essentially of a layer of a thermoplastic polyurethane resin that has a softening point of 70° C. to 200° C. and has a glass transition temperature of −10° C. or lower.

2. The retroreflective sheeting of claim 1, wherein the thermoplastic polyurethane resin is a polycarbonate polyurethane resin.

3. The retroreflective sheeting of claim 1, wherein the thermoplastic polyurethane resin has a glass transition temperature of −10° C. or lower.

4. The retroreflective sheeting of claim 1, wherein the thermoplastic polyurethane has a softening point of 80° C. to 180° C.

5. The retroreflective sheeting of claim 4, wherein the thermoplastic polyurethane has a softening point of 100° C. to 150° C.

6. The retroreflective sheeting of claim 4, wherein the thermoplastic polyurethane has a glass transition temperature of −20° C. or lower.

7. The retroreflective sheeting of claim 6, wherein the bonding layer is 50 to 150 micrometers thick.

8. An article that comprises a plasticized plastic and that has the retroreflective sheeting of claim 1 adhered thereto.

9. The article claim 8, wherein a 180 degree peel strength between said retroreflective sheet and said article body is at least 2 kg/25 mm.

10. An article having retroreflectivity comprising:
    an article body; and
    a retroreflective sheeting of claim 1 adhered to a surface of the article body, wherein a surface of the bonding layer opposite the protective layer is adhered to the surface of the article body by a primer layer between the surface of the article body and the surface of the bonding layer.

11. The article having retroreflectivity of claim 10 wherein the primer layer is selected from the group of a thermoplastic polyurethane resin that has a softening point of 70° C. to 200° C. and has a glass transition temperature of −10° C. or lower, a polymeric polyamine, and mixtures thereof.

* * * * *